(12) United States Patent
Taylor (10) Patent No.: US 10,074,238 B2
(45) Date of Patent: Sep. 11, 2018

(54) TICKETLESS SYSTEM AND METHOD OF MANAGING CASINO PATRON MONEY BALANCES

(75) Inventor: Norman G. Taylor, Dundee (GB)

(73) Assignee: NCR Corporation, Atlanta, GA (US)

( * ) Notice: Subject to any disclaimer, the term of this patent is extended or adjusted under 35 U.S.C. 154(b) by 529 days.

(21) Appl. No.: 12/620,714

(22) Filed: Nov. 18, 2009

(65) Prior Publication Data

US 2011/0118008 A1 May 19, 2011

(51) Int. Cl.
*G07F 17/32* (2006.01)
*G06Q 20/32* (2012.01)

(52) U.S. Cl.
CPC ......... *G07F 17/3244* (2013.01); *G06Q 20/32* (2013.01); *G07F 17/32* (2013.01); *G07F 17/3218* (2013.01); *G07F 17/3225* (2013.01)

(58) Field of Classification Search
CPC . G06Q 20/32; G07F 17/3218; G07F 17/3225; G07F 17/3244
USPC ............................................. 463/25, 40–42
See application file for complete search history.

(56) References Cited

U.S. PATENT DOCUMENTS

| | | | |
|---|---|---|---|
| 7,611,409 B2* | 11/2009 | Muir et al. ....................... | 463/29 |
| 8,019,365 B2* | 9/2011 | Fisher ........................... | 455/466 |
| 2003/0045353 A1* | 3/2003 | Paulsen et al. .................. | 463/40 |
| 2003/0171985 A1* | 9/2003 | Prabhu et al. ................... | 705/14 |
| 2004/0132530 A1* | 7/2004 | Rutanen et al. ................. | 463/42 |
| 2004/0147309 A1* | 7/2004 | Chamberlain et al. ......... | 463/25 |
| 2005/0192078 A1* | 9/2005 | Jawaharlal ...................... | 463/17 |
| 2006/0004656 A1* | 1/2006 | Lee ......................... G06Q 20/04 705/39 |
| 2006/0058090 A1* | 3/2006 | Crawford et al. .............. | 463/13 |
| 2007/0094135 A1* | 4/2007 | Moore et al. ................... | 705/40 |
| 2007/0203836 A1* | 8/2007 | Dodin .................... G06Q 20/02 705/44 |
| 2007/0214080 A1* | 9/2007 | Babi et al. ...................... | 705/39 |
| 2007/0249420 A1* | 10/2007 | Randall .......................... | 463/40 |
| 2008/0140536 A1* | 6/2008 | Ruiz Tejedor et al. ......... | 705/26 |
| 2008/0146337 A1* | 6/2008 | Halonen et al. ................ | 463/42 |
| 2009/0164371 A1* | 6/2009 | Arroyo et al. .................. | 705/42 |
| 2009/0191931 A1* | 7/2009 | Peck ................................ | 463/7 |
| 2011/0263318 A1* | 10/2011 | Agarwal et al. ................ | 463/25 |

* cited by examiner

*Primary Examiner* — David Duffy
(74) *Attorney, Agent, or Firm* — Schwegman, Lundberg & Woessner (57) ABSTRACT

A ticketless system and method of managing casino patron money balances which eliminates paper media handling and reconciliation. The system includes a self-service computer for receiving a first amount of money from a casino patron during a first transaction. The self-service computer stores the first amount and a phone number of a mobile communication device of the patron in a record associated with the patron. The record is accessible to a gaming machine in response to a first message from the mobile communication device of the patron. The self-service computer retrieves a second amount of money from the record during a second transaction representing money transferred from the gaming machine in response to a second message from the mobile communication device of the patron, and transfers the second amount of money to the patron.

11 Claims, 4 Drawing Sheets

TICKETLESS SYSTEM AND METHOD OF MANAGING CASINO PATRON MONEY BALANCES

BACKGROUND

In casinos, patrons may use cash in the form of currency or coins to play games. Patrons may also use paper tickets to carry their money balances from one game to the next. Patrons obtain tickets from assisted-service counters or by depositing cash into self-service computer systems called Ticket-In-Ticket-Out (TITO) machines. When they are finished, patrons may redeem their ticket values to obtain cash from TITO machines. In the end, a large number of tickets are dispensed.

The drawbacks of using paper tickets are that patrons may very easily lose them, they can become destroyed or damaged, casinos incur cost from replenishing tickets, and casinos incur cost for maintaining ticket printers.

Therefore, it would be desirable to provide a ticketless system and method of managing casino patron money balances which minimizes use of paper tickets.

SUMMARY

A ticketless system and method of managing casino patron money balances is provided.

The system includes a self-service computer for receiving a first amount of money from a casino patron during a first transaction. The self-service computer stores the first amount and a phone number of a mobile communication device of the patron in a record associated with the patron. The record is accessible to a gaming machine in response to a first message from the mobile communication device of the patron. The self-service computer retrieves a second amount of money from the record during a second transaction representing money transferred from the gaming machine in response to a second message from the mobile communication device of the patron, and transfers the second amount of money to the patron.

A ticketless method of managing casino patron money balances includes creating a record associated with a patron by a self-service computer, receiving a first amount of money from the patron by the self-service computer, storing the first amount in the record with a reference phone number of a mobile communication device of the patron by a server computer coupled to the self-service computer, receiving a message from the mobile communication device containing a unique identifier associated with a gaming machine by the server computer, determining the record by comparing a phone number associated with the message to the reference phone number by the server computer, and sending a second amount to the gaming machine associated with the unique identifier in the message to facilitate use of the gaming machine by the patron.

DETAILED DESCRIPTION

Figure 1:
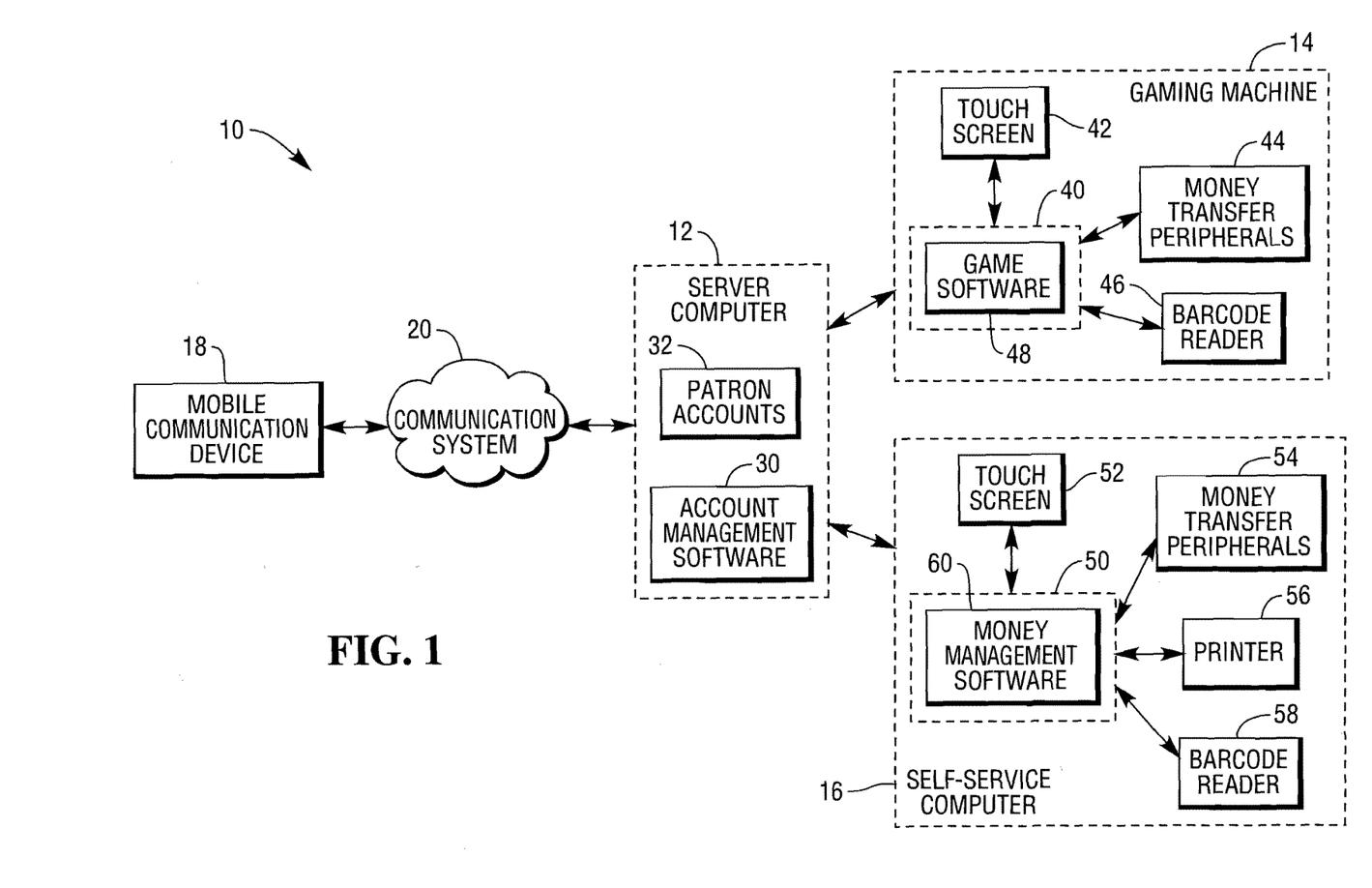
FIG. 1 illustrates a block diagram of an example casino system.

Referring now to FIG. 1, an example casino system 10 includes server computer 12, gaming machine 14, and self-service computer 16. Server computer 12, gaming machine 14, and self-service computer 16 may be coupled via a network.

Server computer 12 executes account management software 30, which establishes and manages patron accounts 32. Patron accounts 32 store patron information, including patron identification information, patron login information, patron contact information, e.g., phone number, and current balance information representing money value.

The functions of server computer 12 may be performed by one or more computers and combinations of computers. For example, the functions of server computer 12 and self-service computer 16 may be combined into a single computer.

An example mobile communication device may include a cellular telephone, personal digital assistant, or other portable communication device.

An example message may include a text message sent via standard Short Message Service or Silent Messaging Service (SMS) techniques and equipment. An example communication system 20 is a cellular communication network that supports SMS messages between mobile communication device 18 and server computer 12.

Server computer 12 is equipped with or interfaces to corresponding communication circuitry to enable server computer 12 to receive messages from mobile communication device via communication system 20.

Gaming machine 14 includes processor 40, which executes gaming software 48. Gaming software 48 controls operation of gaming machine 14, including managing exchanges of money value between server computer 12 and gaming machine 14, and between mobile communication device 18 and gaming machine 14.

Gaming machine 14 additionally includes memory, program and data storage, a display, and a user input device. The display and user input device may be combined as a touch screen 42. An example gaming machine 14 may include a computerized slot machine.

Gaming machine 14 additionally includes components and peripherals necessary to accomplish its purpose. For example, gaming machine 14 may additionally include, but not be limited to, one or more money transfer peripherals 44. Example money transfer peripherals 44 include a card reader for reading debit and credit cards, a currency and/or coin acceptor, a currency and/or coin dispenser. The card reader may also function to read patron loyalty cards.

In support of one example embodiment, gaming machine 14 may include a barcode reader 46 for reading barcodes displayed by mobile communication device 18.

A patron establishes an account 32 using self-service computer 16. The patron may alternatively establish account 32 through an assisted-service location in the casino or via a casino website. The patron inputs credit or debit card information or deposits cash in the form of currency and/or coins to establish an initial balance in account 32 representing money value. The patron may use the money value to purchase casino offered products and services, including gambling services from gaming machine 14.

Before leaving the casino, the patron may cash out at self-service computer 16 or an assisted-service location. The patron receives cash money in the form or currency and/or coins. The patron may alternatively transfer money value to a bank account via electronic funds transfer.

Self-service computer 16 includes processor 50, which executes money management software 60. Money management software 60 performs money transactions on behalf of casino patrons, including cash transfer transactions prior to playing games and cash redemption transactions when patrons are finished playing games.

For example, a casino patron may increase the money balance of account 32 by depositing tangible cash money in exchange for an increase in the money balance or by transferring money value from a bank account of the casino patron in exchange for the increase in the money balance. Conversely, the casino patron may decrease the money balance from account 32 by withdrawing tangible cash money in exchange for a decrease in the money balance or by transferring money value to a bank account of the casino patron in exchange for the decrease in the money balance.

Additional services provided by money management software 30 may include electronic money transfers to and from patron bank accounts, cash withdrawal, cash deposit, and other banking transactions.

Processor 50 may execute additional software directed to the location and purpose of self-service computer 16. For example, processor 50 may execute software for delivering promotions or coupons, for making purchases of goods and services, for reserving a room, or for making travel arrangements and printing boarding passes.

Processor 50 may execute an operating system such as a Microsoft operating system, which can display screen information within one or more windows.

Self-service computer 16 additionally includes memory, program and data storage, a display, and a user input device. The display and user input device may be combined as a touch screen 52. An example embodiment of self-service computer 16 may include a kiosk.

Self-service computer 16 additionally includes components and peripherals necessary to accomplish the purpose for the environment in which it is located. For example, self-service computer 16 may additionally include, but not be limited to, one or more money transfer peripherals 54 and a receipt printer 56 and/or other printer. Example money transfer peripherals include a card reader for reading debit and credit cards, a currency and/or coin acceptor, and a currency and/or coin dispenser. The card reader may also function to read patron loyalty cards.

Self-service computer 16 may include a barcode reader 58 for reading barcodes displayed by mobile communication device 18.

Self-service computer 16 may be equipped with security features to ensure that money balances in patron accounts 32 are secure. For example, a patron may be required to pre-register with a personal identification number (PIN) or biometric signature stored by server computer 12. Self-service computer 16 compares entered PINs or biometric signatures with stored reference PINs or biometric signatures.

In one example embodiment, a patron begins and ends play at each gaming machine 14 by sending a message, such as a text message, to server computer 12 from mobile communication device 18 through communication system 20.

An example message contains an identifier associated with a gaming machine 14. Account management software 30 compares the phone number associated with the message to patron records 32 to identify the patron account 32 of the caller using a caller identification system. Account management software 30 obtains the gaming machine identifier from the message and uses it to contact the associated gaming machine 14. Account management software 30 adds a patron balance representing money value to begin play or removes a patron balance representing money value to end play.

As an alternative or modification to the embodiment, account management software 30 may send a barcode representing current money value and a readable indicator of the money value to mobile communication device 18 following a deposit of money at self-service computer 16 or the assisted-service location. The patron scans the barcode at gaming machine 14 to begin play.

At the end of play, the patron sends a message to service computer 12 containing an identifier associated with gaming machine 14. Account management software 30 compares the phone number associated with the message to identify the patron account 32, and uses the gaming machine identifier to contact the associated gaming machine 14 to remove a patron balance representing money value. Account management software 30 then sends a message containing another barcode representing the patron balance to mobile communication device 18.

To checkout, the patron may scan the barcode at self-service computer 16. The patron receives cash money in the form or currency and/or coins.

Figure 2A:
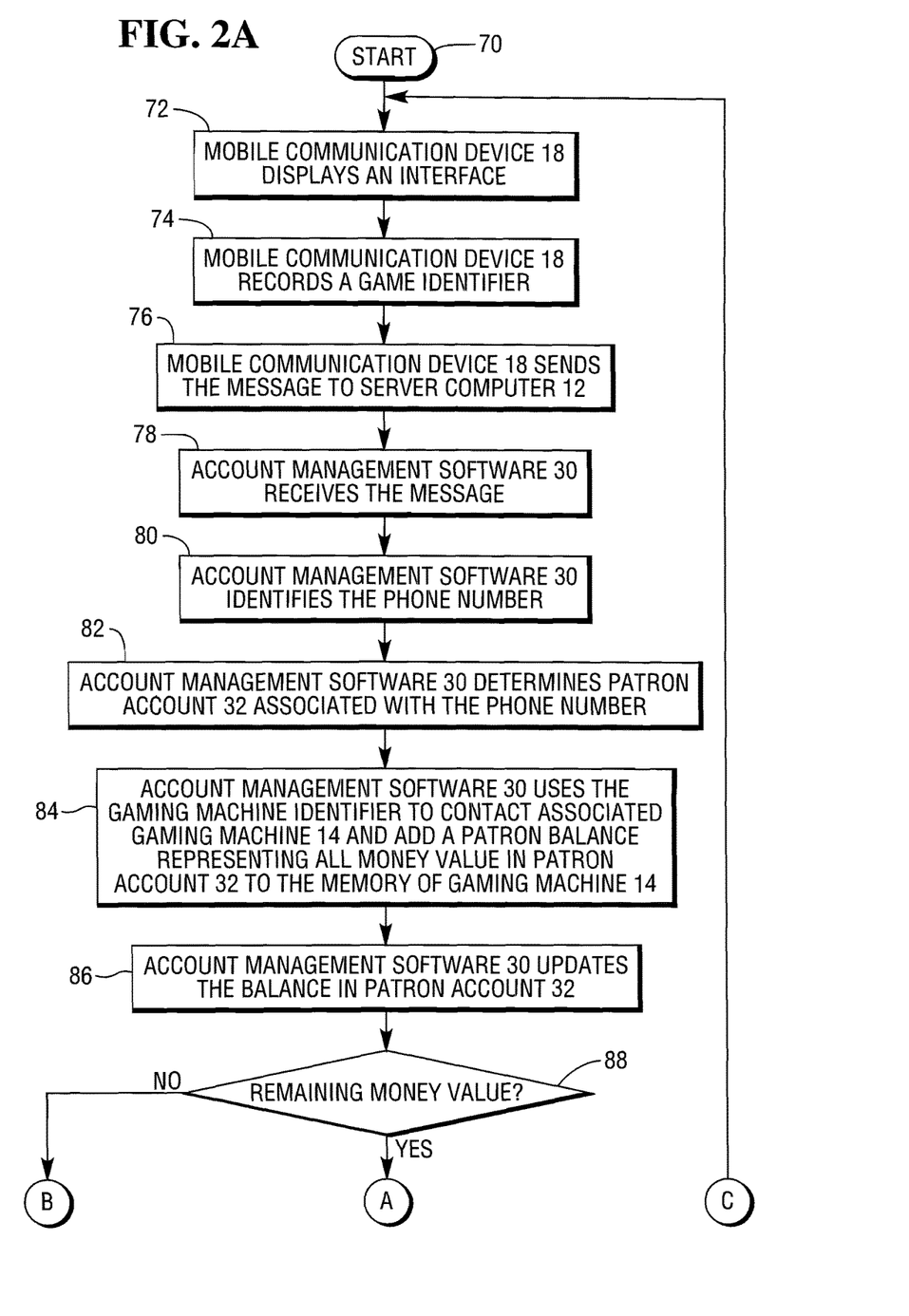
FIGS. 2A and 2B illustrate an example method of managing patron money balances.
Figure 2B:
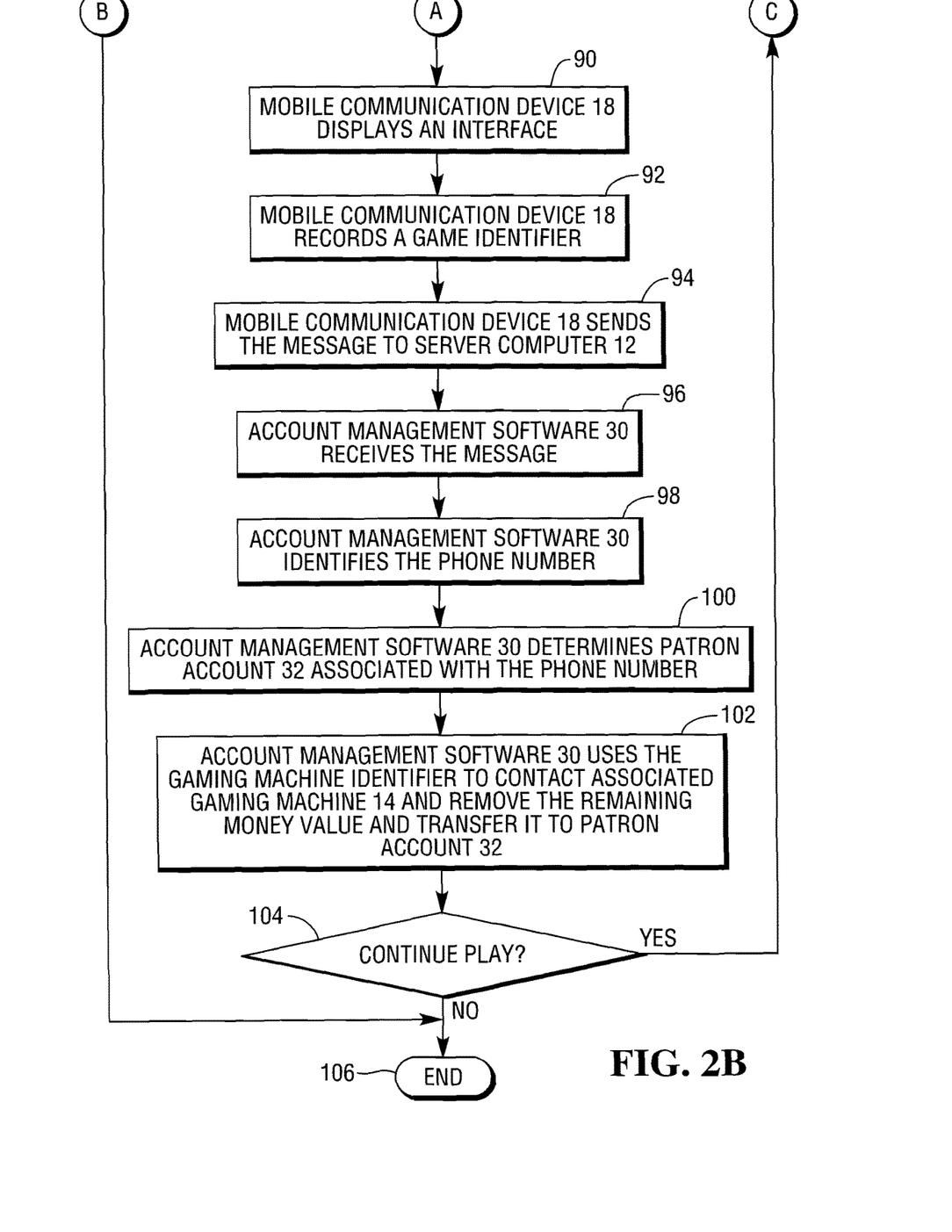

Referring now to FIGS. 2A and 2B, an example method of operation of is illustrated beginning with START 70.

In step 72, mobile communication device 18 displays an interface for entering a message. In this example, messages are text messages sent and received using standard SMS techniques and equipped systems and devices.

In step 74, mobile communication device 18 records a game identifier associated with a patron's choice of gaming machine 14.

In step 76, mobile communication device 18 sends the message to server computer 12.

In step 78, account management software 30 receives the message.

In step 80, account management software 30 identifies the phone number associated with mobile communication device 18.

In step 82, account management software 30 determines patron account 32 associated with the phone number.

In step 84, account management software 30 uses the gaming machine identifier to contact associated gaming machine 14 and add a patron balance representing all money value in patron account 32 to the memory of gaming machine 14.

In step 86, account management software 30 updates the balance in patron account 32.

Gaming machine 14 displays the available money value as feedback to the patron evidencing the correct exchange of money value from patron account 32 to gaming machine 14. Gaming machine 14 is now ready for play.

Following play, a patron may or may not have a remaining money value in gaming machine 14 at step 88. The patron may send a subsequent text message requesting that remaining money value be returned to patron account 32. The patron may also continue playing by inserting cash money into the gaming machine 14. If the patron has no money value remaining in gaming machine 14, the patron may simply leave the casino. Operation ends at step 106. Assuming that the patron has a remaining money value in gaming machine 14, operation continues to step 90.

In step 90, mobile communication device 18 displays an interface for entering a message. This interface may be similar to the interface in step 72.

In step 92, mobile communication device 18 records a game identifier associated with a patron's current gaming machine 14.

In step 94, mobile communication device 18 sends the message to server computer 12.

In step 96, account management software 30 receives the message.

In step 98, account management software 30 identifies the phone number associated with mobile communication device 18.

In step 100, account management software 30 determines patron account 32 associated with the phone number.

In step 102, account management software 30 uses the gaming machine identifier to contact associated gaming machine 14 and remove the remaining money value and transfer it to patron account 32. Gaming machine 14 displays a zero available money value as feedback to the patron evidencing the correct exchange of money value to patron account 32. The patron may use self-service computer 16 to access patron account 32 at any time to verify an existing balance representing money value.

At step 104, the patron may wish to leave, or go to another gaming machine 14 to continue play by returning to step 72.

The example method of FIG. 2 may include enhancements. For example, the method may include security features. In response to a message from mobile communication device 18 requesting that money value be transferred, account management software 30 may send a message to the identified phone number requesting a PIN or other authorization type. The patron responds by typing the PIN in the interface displayed by mobile communication device 18 and sends another message to server computer 12 containing the PIN. Account management software 30 receives the message, obtains the PIN, and compares the received PIN to a reference PIN in patron account 32 to obtain a match before authorizing any transfer of money value in step 84.

Account management software 30 may optionally be capable of identifying multiple types of information in one or more messages, such as an amount of money value including an amount less than an entire money value in patron account 32 or gaming machine 14, a PIN or other authentication information, a source identifier associated with a source of money value including patron account 32 or any of gaming machines 14, and a destination identifier associated with a destination for money value including patron account 32 or any of gaming machines 14. With source and destination identifiers, account management software 30 may send money value from one gaming machine 14 to another in one step, without have to first transfer money value from a gaming machine 14 to patron account 32.

As another enhancement or patron option, account management software 30 may send a barcode representing current money value and a readable indicator of the money value to mobile communication device 18 following a deposit of money at self-service computer 16 or the assisted-service location. The patron scans the barcode at gaming machine 14 to begin play.

At the end of play, the patron sends a message to service computer 12 containing an identifier associated with gaming machine 14. Account management software 30 compares the phone number associated with the message to identify the patron account 32, and uses the gaming machine identifier to contact the associated gaming machine 14 to remove a patron balance representing money value. Account management software 30 then sends a message containing another barcode representing the patron balance to mobile communication device 18.

Figure 3:
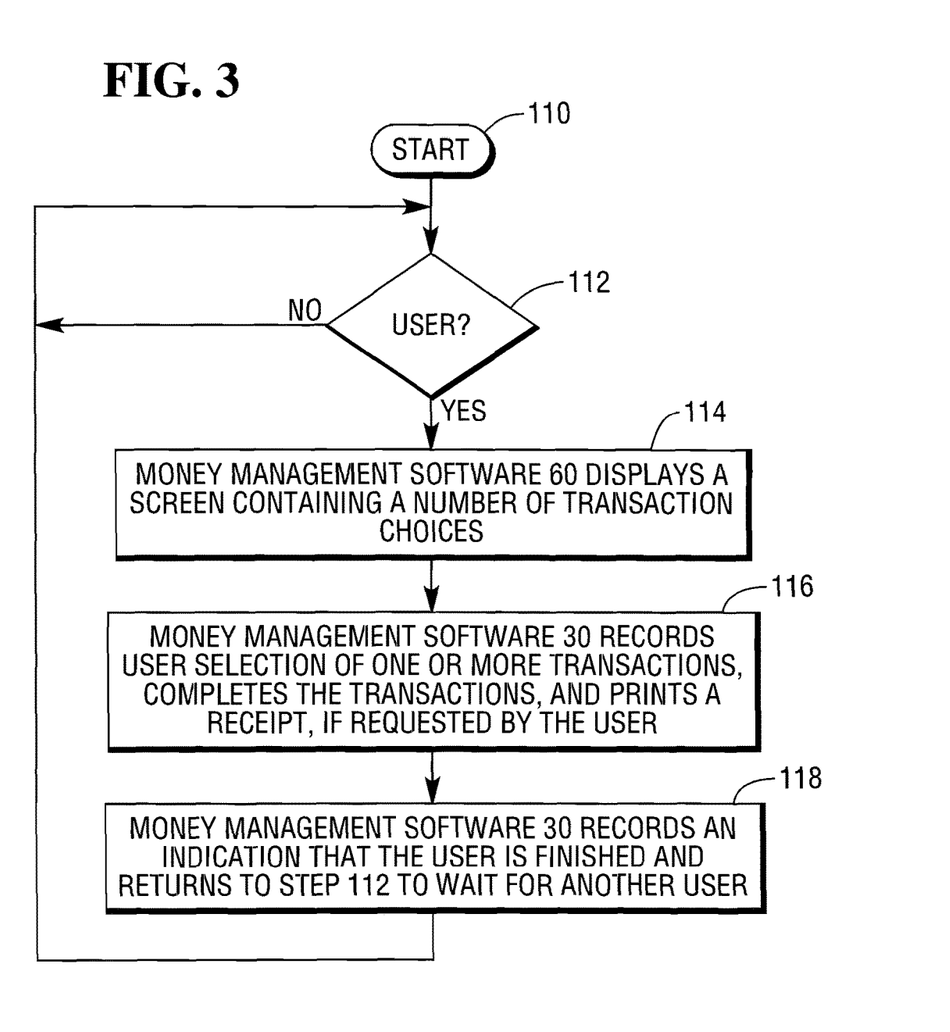
FIG. 3 illustrates an example method of operation of a self-service computer.

Referring now to FIG. 3, an example method of operation of self-service computer 16 is illustrated beginning with START 110.

In step 112, money management software 60 waits for a user.

In step 114, money management software 60 displays a screen containing a number of transaction choices, including choices directed to depositing tangible cash money to increase the money value in patron account 32, and withdrawing tangible cash money to decrease the money value in patron account 32. Money management software 30 may offer additional choices, including electronic money transfers to and from patron bank accounts, and other banking transactions.

In step 116, money management software 30 records user selection of one or more transactions, completes the transactions, and prints a receipt, if requested by the user.

In step 118, money management software 30 records an indication that the user is finished and returns to step 112 to wait for another user.

Although particular reference has been made to certain embodiments, variations and modifications are also envisioned within the spirit and scope of the following claims.

What is claimed is:

1. A ticketless system for managing casino patron money balances comprising:
   a self-service computer;
   a cash acceptor integrated into the self-service computer configured to accept cash; and a cash dispenser integrated into the self-service computer configured to dispense cash;
   wherein, the self-service computer is configured for receiving a first amount of money from a casino patron during a first transaction through the cash acceptor and for setting up an account for the casino patron with a casino, the self-service computer located within the casino, wherein the self-service computer is further configured to register the account with a biometric signature provided by the casino patron, and wherein the self-service computer is further configured for storing the first amount and a phone number of a mobile communication device of the casino patron in a record associated with the account of the casino patron, the phone number representing a mobile communication identifier for the mobile communication device, wherein the record is accessible to a gaming machine, without using a ticket, in response to a first message sent from the mobile communication device of the casino patron to the self-service computer and the first message is a single message that includes: 1) a gaming machine identifier that identifies the gaming machine, 2) the mobile communication identifier that identifies the mobile communication device, 3) a Personal Identification Number (PIN) of the casino patron for access to the account, and 4) a source identifier that identifies the account of the casino patron where the first amount was deposited at the cash acceptor; and the first message is a first text message and in response to the first message, the self-service computer adds all money available in the account of the casino patron to memory of the gaming machine and the self-service computer retrieves a second amount of money from the record during a second transaction, wherein the second amount of money represents money transferred directly from the gaming machine following game play by the casino patron processed on the gaming machine to the self-service computer in response to a second message that is sent from the mobile communication device of the casino patron to the self-service computer, and the second message is a second text message, and for transferring the second amount of money to the casino patron retrievable from the self-service computer, and wherein the self-service computer is also configured to execute software directed to a location and purpose of the self-service computer, wherein a processor of the self-service computer is specifically configured to execute the software to provide the casino patron with at least one option to:

print a boarding pass, make travel arrangements or reserve a room, and purchase goods and services; and wherein when the second text message includes a destination identifier for a second gaming machine that the casino patron desires to play following play on the gaming machine, the second amount of money is transferred from the gaming machine directly to the second gaming machine rather than to the self-service computer.

2. The system of claim 1, wherein the self-service computer transfers the second amount of money to a patron bank account.

3. The system of claim 1, wherein the self-service computer stores the record.

4. A ticketless system for managing casino patron money balances comprising:

a self-service computer;

a cash acceptor integrated into the self-service computer and configured for accepting cash;

a cash dispenser integrated into the self-service computer and configured for dispensing cash;

wherein the self-service computer is configured for receiving an amount of money from a casino patron during a transaction through the cash acceptor and set up an account for the casino patron at a casino with a biometric signature provided by the casino patron, the self-service computer located within the casino;

a server computer configured for storing a record associated with the account of the casino patron containing the amount and a reference phone number of a mobile communication device of the casino patron, the reference phone number representing a mobile communication device identifier for the mobile communication device; and a gaming machine configured for directly receiving the amount from the record from the server computer, without using a ticket, in response to a text message sent from the mobile communication device of the casino patron and for displaying the amount, wherein the text message is a single message that is associated with: 1) the mobile communication device identifier that identifies the mobile communication device, 2) a gaming machine identifier that identifies the gaming machine, 3) a source identifier for obtaining the amount that identifies the account where the amount was deposited by the casino patron at the cash acceptor, and 4) a Personal Identification Number (PIN) for authenticated access to the account;

wherein the server computer is further configured for receiving the text message from the mobile communication device, obtaining a unique identifier associated with the gaming machine from the text message and the unique identifier is the mobile communication device identifier, comparing a text message phone number associated with the text message to the reference phone number in the record and wherein the text message phone number is the mobile communication device identifier, and directly adding all money available in the account of the casino patron to memory of the gaming machine based upon the unique identifier and at least a match between the reference phone number associated with the text message and the text message phone number, and the self-service computer is also specifically configured to execute software directed to a location and purpose of the self-service computer, wherein a processor of the self-service computer is configured to execute the software to provide the casino patron with at least one option to: print a boarding pass, make travel arrangements or reserve a room, and make a purchase of goods and services, and wherein the server computer is further configured for receiving a second text message from the mobile communication device for transferring a second amount from the gaming machine at a conclusion of game play processed on the gaming machine to the self-service computer for the casino patron to withdraw at the self-service computer, and wherein the server computer is configured for sending a message to the mobile communication device in response to the transferring of the second amount indicating a patron balance for the account and wherein when the second text message includes a destination identifier for a second gaming machine that the casino patron desires to play following play on the gaming machine, transferring the second amount from the gaming machine directly to the second gaming machine rather than to the self-service computer.

5. A ticketless method of managing casino patron money balances, the method comprising software residing in a non-transitory computer readable medium and executed by a processor of a self-service computer and a server computer to perform the method, comprising:

creating, by the software executing on the self-service computer, a record associated with a patron and setting up an account for the patron with a casino that is associated with the record, and interacting, by the self-service computer, with a cash acceptor for accepting cash from the patron in setting up the account and obtaining a biometric signature of the patron, and interacting, by the self-service computer with a cash dispenser for dispensing cash to the patron, and wherein the self-service computer is located within the casino;

receiving, by the software, a first amount of money from the patron through the cash acceptor;

storing, by the software, the first amount in the record with a reference phone number of a mobile communication device of the patron in the server computer separate from and in communication with the self-service computer, wherein the reference phone number represents a mobile communication device identifier for the mobile communication device;

receiving, by the software, a text message from the mobile communication device and the text message is a single message associated with: 1) a unique identifier associated with a gaming machine by the server computer, 2) a source identifier that identifies the account where the first amount was deposited by the patron at the cash acceptor, 3) a Personal Identification Number (PIN) of the patron for accessing the account, and 4) the mobile communication device identifier for identifying the mobile communication device of the patron;

determining, by the server computer, the record by comparing a phone number associated with the text message to the reference phone number;

directly adding, by the server computer, a second amount to memory of the gaming machine associated with the unique identifier in the text message to facilitate use of the gaming machine by the patron, without using a ticket, and wherein the second amount represents all money available in the account of the patron;

receiving, by the server computer, a second text message to withdraw a third amount from the gaming machine at a conclusion of game play processed on the gaming machine by the patron for the patron to withdraw at the self-service computer;

wherein when the second text message includes a destination identifier for a second gaming machine that the patron desires to play following play on the gaming machine, transferring, by the software, the third amount from the gaming machine directly to the second gaming machine rather than to the self-service computer;

and providing, by the software, the patron with at least one option to: print a boarding pass, make travel arrangements or reserve a room, and purchase goods and services.

6. The method of claim 5, wherein the first amount equals the second amount.

7. A self-service apparatus comprising:

a money transfer peripheral comprising a cash acceptor, a cash dispenser, and a card reader;

wherein the self-service apparatus is configured to:

set up an account with a casino for a user through interaction with a server computer and obtain a biometric signature provided by the user for access to the account;

receive a money deposit from the user via the money transfer peripheral;

increase a money balance of the account associated with the user by a deposit amount associated with the money deposit through interaction with the server computer;

receive, by the server computer a text message from a mobile device of the user requesting transfer of an amount of the money balance of the account to a gaming machine indicated by a gaming machine identifier contained in the text message with the text message that is a single message and is also associated with: 1) a source identifier for obtaining the deposit amount and that identifies the account where the amount was transferred following the money deposit at the money transfer peripheral, 2) a Personal Identification Number (PIN) for accessing the account, and 3) a mobile device identifier that identifies the mobile device and represented by a phone number for the mobile device;

directly add, by the server computer, all of the money balance available in the account of the user to memory of the indicated gaming machine to initiate game play on the gaming machine by the user without using a ticket;

receiving, by the server computer, a second text message from the mobile device identifying a second amount of money to transfer from the gaming machine at a conclusion of game play processed on the gaming machine for the user to withdraw at the self-service apparatus;

wherein when the second text message includes a destination identifier for a second gaming machine that the user desires to play following play on the gaming machine, the second amount of money is transferred from the gaming machine directly to the second gaming machine rather than to the self-service apparatus;

and execute software, on a processor of the self-service apparatus, directed to a location and purpose of the self-service apparatus and in response to executing the software providing the user with at least one option to: print a boarding pass, make travel arrangements or reserve a room, and purchase goods and services, and wherein the self-service apparatus is located within the casino.

8. The self-service apparatus of claim 7, wherein the self-service apparatus is further configured to:

receive a message from the user requesting retrieval of an amount of money from the gaming machine;

retrieve the requested amount of money from the gaming machine; and increase the money balance of the account associated with the user by the amount of money retrieved.

9. The self-service apparatus of claim 7, wherein the self-service apparatus is further configured to:

receive a request from the user to dispense a requested amount of cash money from the account associated with the user; and dispense the requested amount of cash money to the user via the money transfer peripheral.

10. A method for managing ticketless money transfers of patrons in a casino, the method implemented as software residing in a non-transitory computer-readable medium and executed by one or more processors of a self-service computer to perform the method comprising:

receiving, by the self-service computer, a money deposit from a user via a money transfer peripheral, wherein the money transfer peripheral comprises for a cash acceptor for accepting cash from the user during initial account setup and obtaining a biometric signature of the user during the initial account setup, and the money transfer peripheral comprises a cash dispenser for dispensing cash to the user, and the money transfer peripheral comprises a card reader, and wherein the money transfer peripheral sets up an account for the user with the casino by receiving cash from the user through the cash acceptor;

increasing, by the self-service computer, a money balance of the account associated with the user by a deposit amount of the cash deposited through interacting with a server computer;

receiving, by the server computer, a text message from a mobile device of the user requesting transfer of an amount of the money balance of the user account to a gaming machine indicated by a gaming machine identifier contained in the text message with the text message that is a single message and is also associated with: 1) a source identifier that identifies the account where the amount was transferred following the money deposit at the money transfer peripheral, 2) a Personal Identification Number (PIN) for accessing the account, and 3) a mobile device identifier for identifying the mobile device;

directly adding, by the server computer, all of the money balance available in the account of the user to memory of the gaming machine for game play by the user and processed on the gaming machine without using a ticket;

receiving, by the server computer, a second text message from the mobile device for withdrawing a second amount of money from the gaming machine at a conclusion of game play for the user to withdraw at the self-service computer;

wherein when the second text message includes a destination identifier for a second gaming machine that the user desires to play following play on the gaming machine, transferring, by the server computer, the second amount of money from the gaming machine directly to the second gaming machine rather than to the self-service computer; and executing software, on a processor of the gaming machine, directed to a location and purpose of the gaming machine and in response to executing the software providing the user with at least one option to: print a boarding pass, make travel arrangements or reserve a room, and purchase goods and services, wherein the gaming machine is located within the casino.

11. The method of claim 10 further comprising:

receiving a request from the user to dispense an amount of cash money from the account associated with the user; and dispensing the requested amount of cash money to the user via the money transfer peripheral.

* * * * *